UNITED STATES PATENT OFFICE.

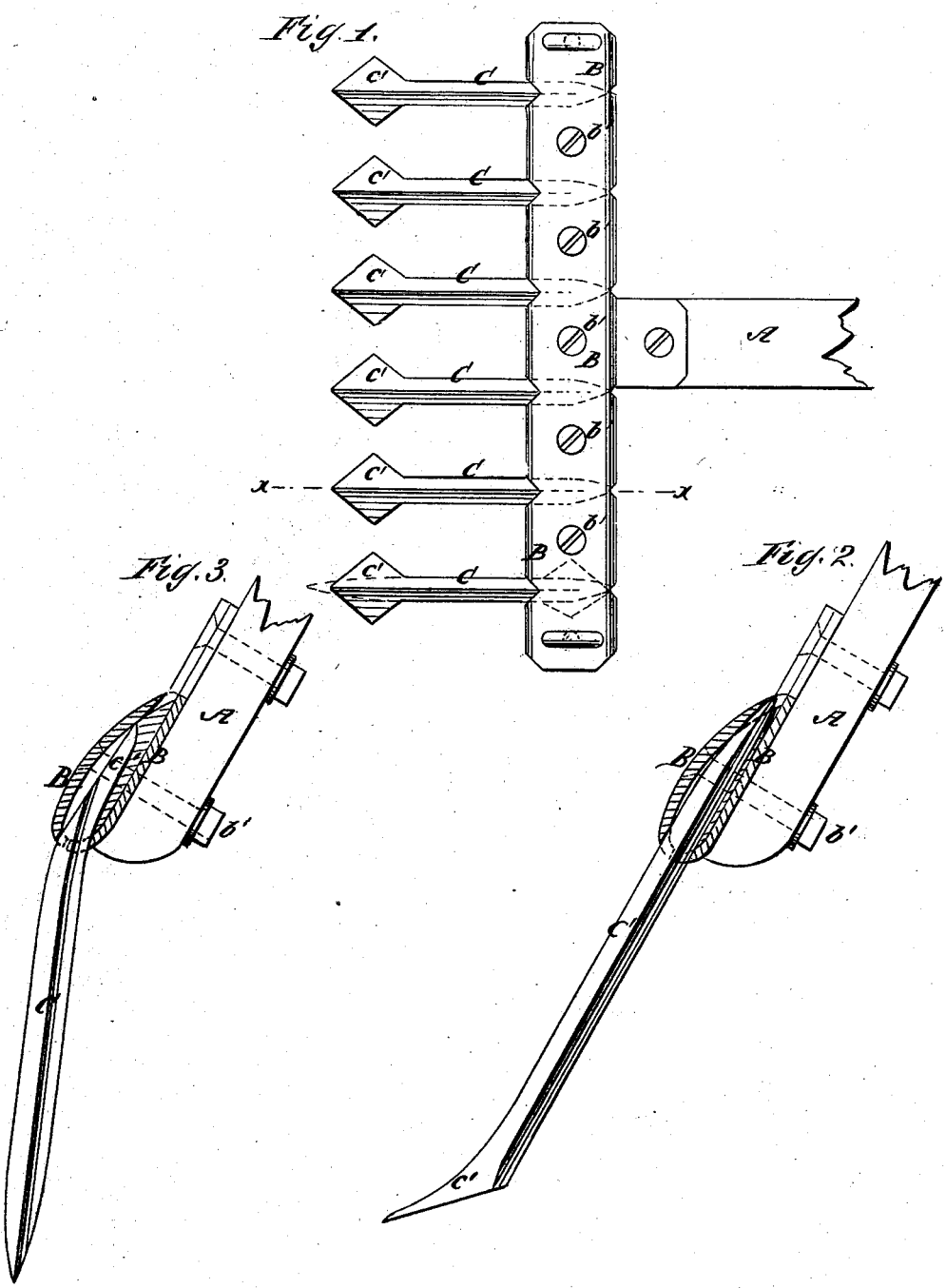

ISAAC P. PICKERING, OF TABLE GROVE, ILLINOIS.

IMPROVEMENT IN COMBINED CULTIVATORS AND HARROWS.

Specification forming part of Letters Patent No. 168,181, dated September 28, 1875; application filed August 14, 1875.

*To all whom it may concern:*

Be it known that I, ISAAC PIERSON PICKERING, of Table Grove, in the county of Fulton and State of Illinois, have invented a new and useful Improvement in Combined Cultivator and Harrow, of which the following is a specification:

Figure 1 is a front view of my improved device. Fig. 2 is a cross-section of the same, taken through the line $x\,x$, Fig. 1. Fig. 3 is the same section as Fig. 2, but showing the tooth adjusted as a harrow.

Similar letters of reference indicate corresponding parts.

The object of this invention is to furnish an improved device to be attached to the standard and beam of a plow-stock, to enable it to be used as a cultivator, and which may be readily adjusted to operate as a harrow.

The invention consists in the combination of the head, made in two parts or halves bolted together, and provided with grooves and with recesses in their inner surfaces, and the reversible square teeth, made pointed at one end, and provided with shovels at their other ends, with each other, as hereinafter fully described.

A represents the lower end of the standard of a plow-stock. B is the head, which consists of two parts or halves, secured to each other by a number of bolts, $b'$. In the inner sides of the halves B are formed transverse V-grooves to receive the teeth C. The teeth C are made square, and are set diagonally in the grooves in the plates of the head B, where they are secured by tightening up the bolts $b'$. The teeth C are made tapering at one end, and have shovels $c'$ formed upon their other ends. In the inner surfaces of the halves of the head B are formed recesses to receive the shovels $c'$ of the teeth C, so that the teeth C may be secured in the head B, with the shovels $c'$ downward, so that the device may operate as a cultivator for cultivating small plants, or secured with the points of said teeth downward, so that the device may operate as a harrow for putting in small grain. The end bolts $b'$ have eyes formed in their heads to receive the rear ends of brace-rods, the forward ends of which are designed to be bolted to the plow-beam adjustably, so that the pitch of the teeth may be regulated as desired. The head B is secured to the standard by two bolts, the lower one of which passes through the center of the head B, and the upper one passes through lugs formed upon the upper edges of the halves of the said head.

In case the teeth C are so arranged that one of them will come in the center of the head B the lower standard-bolt should pass through the lower half of the head B only, and its head should be countersunk into the inner surface of said half.

To form a cultivator, one, two, or more heads may be used, and four, more or less, heads may be used to form a harrow.

When two of the heads are placed one in front of the other, the teeth should be so arranged that the teeth of the one head may be opposite the spaces between the teeth of the other head, so as to more thoroughly stir up the soil.

Having thus described my invention, I claim as new and desire to secure by Letters Patent—

The combination of the head B, made in two parts or halves bolted together, and provided with V-grooves and with recesses in their inner surfaces, and the reversible square teeth C, made pointed at one end, and provided with shovels $c'$ at their other ends, with each other, substantially as herein shown and described.

ISAAC PIERSON PICKERING.

Witnesses:
   J. R. ROTHMAN,
   THEODORE WRIGHT.